United States Patent
Tomotoshi

Patent Number: 6,154,107
Date of Patent: Nov. 28, 2000

[54] INHIBITOR SWITCH WITH RATTLE PREVENTING STRUCTURE

[75] Inventor: Tetsuya Tomotoshi, Tokyo, Japan

[73] Assignee: Niles Parts Co., Ltd., Tokyo, Japan

[21] Appl. No.: 09/457,378

[22] Filed: Nov. 20, 1999

[30] Foreign Application Priority Data

Dec. 16, 1998 [JP] Japan ................... 10-375485

[51] Int. Cl.⁷ ................................................. H01H 9/00
[52] U.S. Cl. ..................................... 335/205; 200/61.88
[58] Field of Search .......................... 335/205–207; 200/61.88–61.91; 74/335

[56] References Cited

U.S. PATENT DOCUMENTS

| | | | |
|---|---|---|---|
| 5,307,013 | 4/1994 | Santos et al. | 324/207.2 |
| 5,370,015 | 12/1994 | Moscatelli | 74/335 |
| 5,525,768 | 6/1996 | Cobb, III et al. | 200/61.88 |
| 5,621,317 | 4/1997 | Wozniak | 324/207.13 |
| 5,969,313 | 10/1999 | Ileshima et al. | 200/61.88 |
| 5,977,496 | 11/1999 | Halberg et al. | 200/61.88 |

FOREIGN PATENT DOCUMENTS 59-146222  9/1984  Japan .

Primary Examiner—Lincoln Donovan
Assistant Examiner—Tuyen T. Nguyen
Attorney, Agent, or Firm—Ronald P. Kananen; Rader, Fishman & Grauer

[57] ABSTRACT

An inhibitor switch comprises a movable board (1) having a movable arm (1b) carrying a permanent magnet (4) and being rotatable in accordance with a selected position of an automatic transmission, a magnetic sensor (9) detecting magnetic lines of force of the permanent magnet (4), a base board (3) having the magnetic sensor (9) mounted thereon and having the movable board (1) rotatably supported thereon, and a lid (2) having the movable board (1) rotatably supported thereon. The permanent magnet (4) is urged by a spring (13) toward the magnetic sensor (9). The movable board (1) includes a hollow shaft (1a) and the movable arm (1b) which are in one piece construction. The movable arm (1b) has the permanent magnet (4) and projections (1f, 1g) and a blind hole (1j). The projections are provided on one surface of the movable arm facing the base board (3) in pressure contact with the base board (3). The blind hole (1j) is formed in the other surface of the movable arm (1b) facing the lid (2) and receives a pressure-contact (14) inserted together with the spring (13) therein. As a result, an inhibitor switch is provided that has magnetic sensors and is inexpensive and highly reliable.

17 Claims, 8 Drawing Sheets

INHIBITOR SWITCH WITH RATTLE PREVENTING STRUCTURE

RELATED APPLICATIONS

The subject matter of this application is related to the subject matter of the Applicant's copending applications Ser. No. 09/386,193 filed Aug. 30, 1999, Ser. No. 09/386,194 filed Aug. 30, 1999, and Ser. No. 09/386,002 filed Aug. 30, 1999.

BACKGROUND OF THE INVENTION

1. Field of the Invention

The present invention relates to an inhibitor switch whose contact positions are switched in accordance with selected positions of an automatic transmission used in an automobile, and more particularly, to an improvement of an inhibitor switch having contacts formed of a magnetic sensor and a permanent magnet.

2. Description of the Related Art

A conventional inhibitor switch is disclosed, for example, in Japanese Utility Model Preliminary Publication No. 59-146222. This conventional inhibitor switch has a permanent magnet fittingly bonded to a lever using an adhesive, and a main body insert-molded with a printed circuit board having a magnet-detecting element mounted thereon.

An important characteristic of an inhibitor switch is that the contacts of the switch have high dimensional accuracy. However, the conventional inhibitor switch is of a simple structure in which the permanent magnet is attached to an end portion of the lever and is merely rotated. With this construction, the permanent magnet is apt to rattle, and therefore, the magnet sensor cannot accurately detect the magnetic flux of the permanent magnet. Thus, the selected positions of the lever cannot be accurately detected.

SUMMARY OF THE INVENTION

An object of the present invention is to provide an inhibitor switch in which the selected positions of the lever can be accurately detected.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

According to a broad aspect of the present invention, an inhibitor switch is provided comprising a movable board having a permanent magnet and being rotatable in accordance with a selected position of an automatic transmission, a magnetic sensor detecting magnetic lines of force of the permanent magnet, a base board having the magnetic sensor mounted thereon and having the movable board rotatably supported thereon, and a lid having the movable board rotatably supported thereon. The inhibitor switch is characterized by the movable board having a movable arm urged by a spring such that the permanent magnet is urged by the spring toward the magnetic sensor.

According to other aspects of the present invention, the movable board includes a hollow shaft formed in one-piece construction with the movable arm. The movable arm has the permanent magnet mounted thereon. The movable arm has the permanent magnet and a projection provided on one surface of the movable arm facing the base board, the projection being in pressure contact with the base board. The movable arm has a blind hole formed in the other surface of the movable arm facing the lid, the blind hole receiving a pressure-contact piece inserted together with the spring therein.

The projection and the permanent magnet on the movable board are arranged on the movable arm and are concentric to an axis of the hollow shaft of the movable board. The movable board includes a hollow shaft and a movable arm which are formed in one-piece construction. The permanent magnet is provided in a movable piece received in a recess that is formed in the movable board, the movable piece being received such that the movable piece can be extended from the recess and retracted into the recess.

The movable arm of the movable board has projections formed on a surface thereof facing the lid, the projections being in pressure contact with an inner surface of the lid. The movable arm has a recess formed in a surface thereof facing the base board, the recess receiving the movable piece therein. The movable piece has the permanent magnet on the surface thereof facing the base board, and has projections in pressure contact with the base board.

The spring is one of a plurality of springs received in blind holes formed either in the movable arm or in the movable piece. The movable piece has the projections and the permanent magnet arranged on the movable piece such that the projections and the permanent magnet are concentric to an axis of the hollow shaft. The base board has slide surfaces on which the projections slide, the slide surfaces being formed around the hollow shaft and around an outer periphery of a bottom surface of the base board.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A first embodiment of the present invention will now be described in detail with reference to FIGS. 1 to 8 of the accompanying drawings.

Figure 2:
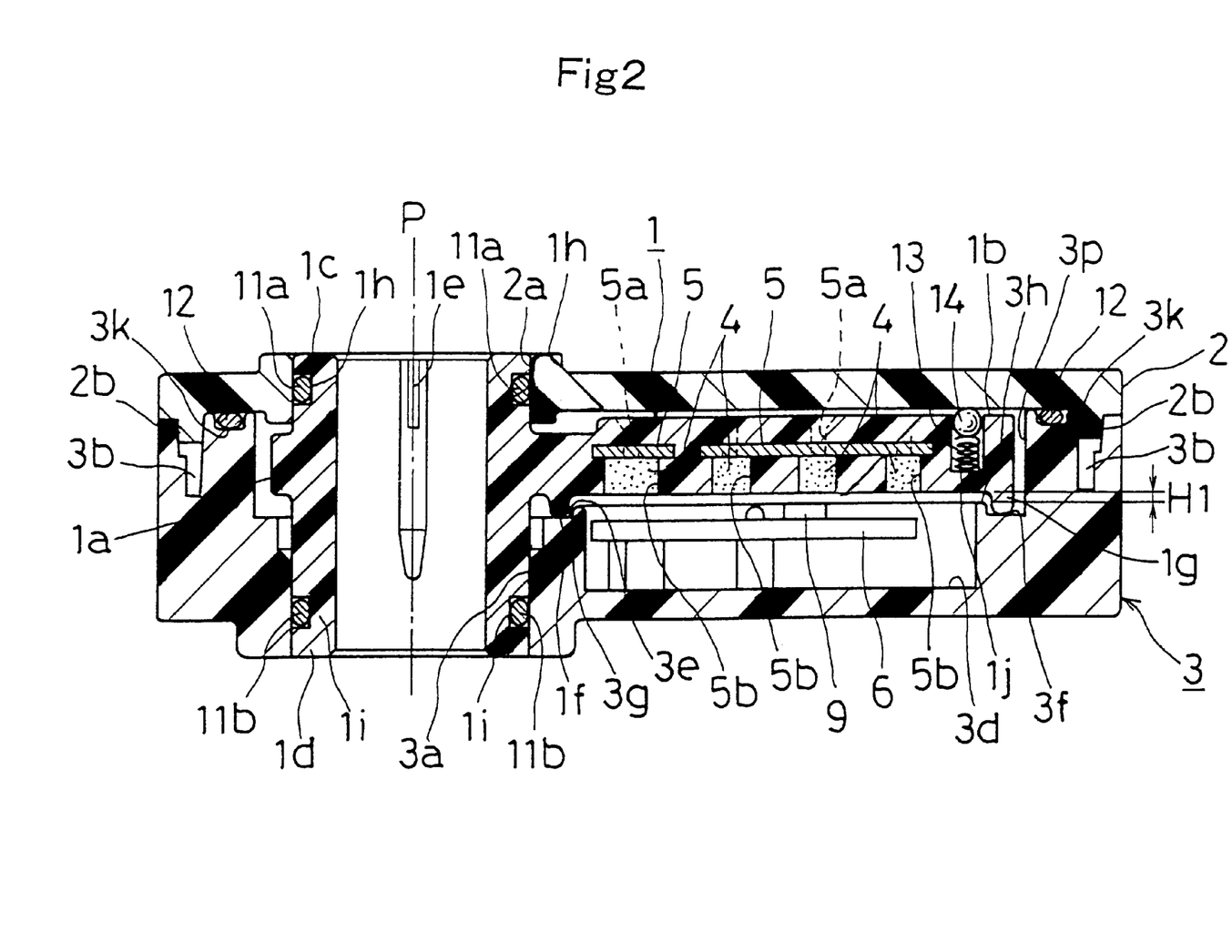
FIG. 2 is an enlarged central longitudinal cross-sectional view, illustrating the first embodiment of the invention.

A movable board 1 includes a hollow shaft 1a and a movable arm 1b formed in one-piece construction with the hollow shaft 1a. The hollow shaft 1a receives a transmission lever shaft (not shown) of an automatic transmission fittingly inserted thereinto. The arm 1b has a permanent magnet 4 and a yoke 5. As shown in FIG. 2, an upper end portion 1c of the hollow shaft 1a of the movable board 1 is fittingly received into a bearing hole 2a formed in a lid 2, and a lower end portion 1d of the hollow shaft 1a is fittingly received into a bearing hole 3a formed in an a base board 3. The movable board 1 is rotatably sandwiched between the lid 2 and the base board 3. The hollow shaft 1a may directly receive the transmission lever fitted thereinto or receive a shaft (not shown) drivingly connected to the transmission lever.

Figure 3:
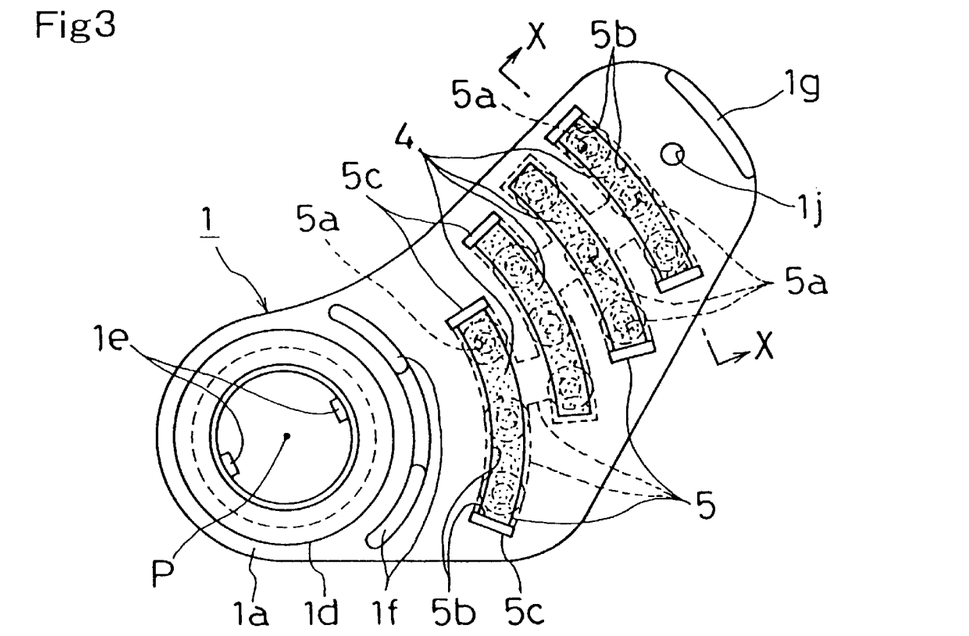
FIG. 3 is an enlarged bottom view of a movable board, illustrating the first embodiment of the invention.
Figure 4:
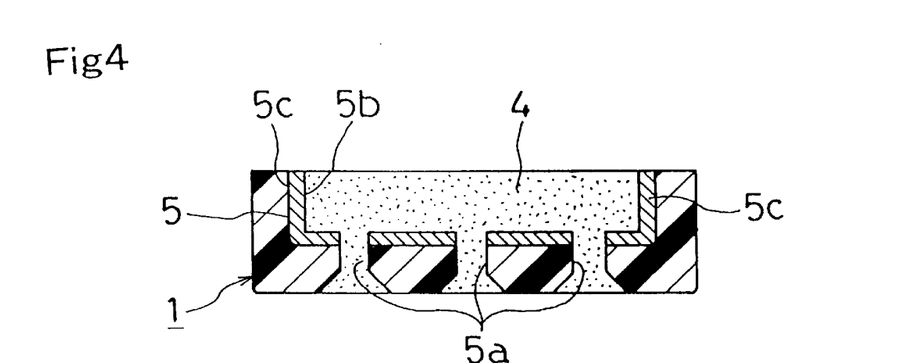
FIG. 4 is an enlarged longitudinal cross-sectional view taken along lines 4—4 of FIG. 3.
Figure 5:
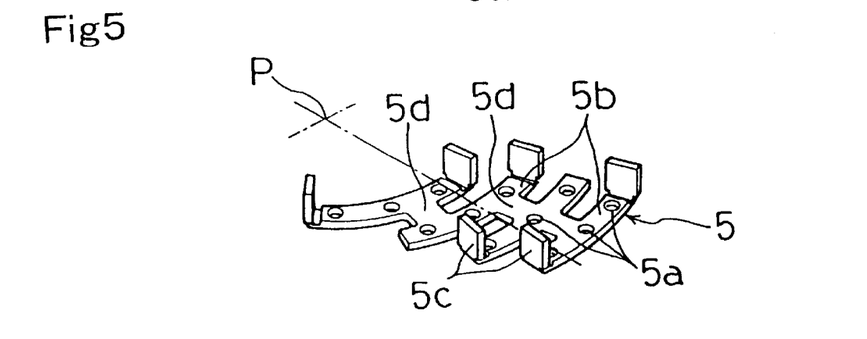
FIG. 5 is a perspective view of a yoke, showing the first embodiment of the invention.

As shown in FIGS. 3, 4, and 5, the yoke 5 includes four arc-shaped iron plates that are integrally continuous with each other. Each of the four arc-shaped iron plates has its longitudinal end portions bent so that the iron plate is generally in the shape of a U, and is formed with a gate hole 5a substantially in the middle of the bottom of the iron plate in the longitudinal direction. The movable board 1 may not have the yoke 5 formed integrally therewith. The permanent magnet 4 may be mounted to the movable board 1 by using any suitable means and the permanent magnet 4 may be of any type and may be formed of any suitable material.

For example, in manufacturing the movable board 1, pins (not shown) are first fitted into the gate holes 5a. Then, the yoke 5 is insert-molded with the movable board 1 from a resin material. The thus manufactured primary molded article has recesses defined by the exposed surface of the bottoms 5b and the bent end portions 5c of the yoke 5. This primary article of the movable board 1 is set into a mold in which a permanent magnet is molded. Then, the mixture of neodymium powder (magnetic material) and PPS pellets referred to as a bonded magnet or a plastic magnet is injected into the mold, thereby producing a secondary article of the movable board 1 with the permanent magnets 4 formed therein. Thus, the movable board 1 is completed.

As shown in FIGS. 3, 4 and 5, the gate holes 5a are formed in the bottom 5b of each recess in which a corresponding permanent magnet 4 is formed, the gate holes being in the left and right end portions of the bottom 5b and in the middle of the bottom 5b so that the permanent magnet is prevented from dropping off. The number of gate holes 5a is not limited. If a single gate hole 5a is to be provided in the bottom 5b, the gate hole 5a should be formed substantially in the middle of the bottom 5b. The exposed surface of the permanent magnet 4 is flush with the movable board 1 and the yoke 5 as shown in FIG. 4.

Figure 1:
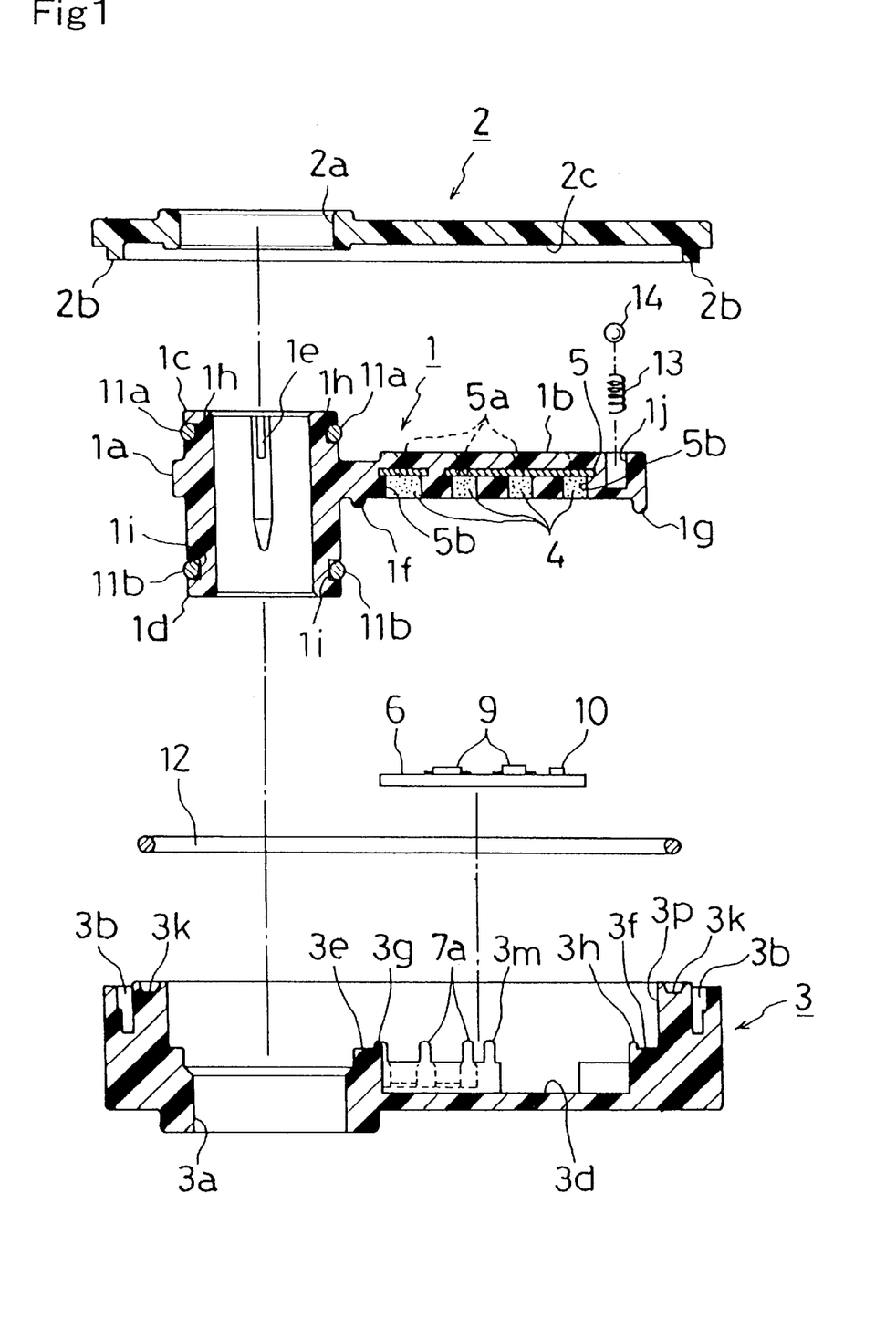
FIG. 1 is an exploded cross-sectional view, illustrating a first embodiment of the invention.

As shown in FIGS. 1 and 2, the hollow shaft 1a is formed with a key 1e in an inner surface of the hollow shaft 1a, the key 1e fitting into a key groove formed in the shaft of the transmission lever. The hollow shaft 1a is formed with grooves 1h and 1i in its outer circumferential surface into which O-rings 11a and 11b are inserted, respectively. The O-ring 11a fitted into the groove 1h improves the sealing effect between the hollow shaft 1 and the lid 2. The O-ring 11b fitted into the groove 1i improves the sealing effect between the hollow shaft 1 and the base board 3.

The movable arm 1b has the permanent magnet 4 and the yoke 5 which are insert-molded. The movable arm 1b is formed with a blind hole 1j in its upper surface into which a pressure-contact 14 and a spring 13 are inserted. As shown in FIG. 3, the movable arm 1b has a projection 1f formed on a lower surface thereof, the projection 1f projecting downward and extending to partly surround the lower end portion 1d of the hollow shaft 1. The movable arm 1b has a projection 1g that is formed on an end portion thereof near a periphery of the movable arm 1b and projects therefrom. The four permanent magnets 4 and the bent end portions 5c of the yoke 5 located at the longitudinal ends of the permanent magnets 4 are exposed and are flush with the surface of the movable arm 1b.

The projections 1f and 1g have a semicircular cross section at end portions thereof. The projection 1f slides on a slide surface 3e that surrounds the bearing hole 3a in the base board 3, and the projection 1g slides on a slide surface 3f near the periphery of a bottom surface 3d. The blind hole 1j is formed at a location away from an axis P of the hollow shaft 1a as shown in FIG. 3. The blind hole 1j is located, for example, between the permanent magnet 4 and the projection 1g which is formed on the end portion of the movable board 1. The blind holes 1j may be formed in either the movable board 1 or the lid 2 facing the movable board 1. The projections 1f and 1g and the permanent magnet 4 on the movable board 1 are formed to describe substantial arcs about the axis P of the hollow shaft 1a.

The spring 13 takes the form of, for example, a coil spring. The pressure-contact 14 is in the form of a steel ball or a stopper pin having a spherical tip end. The pressure-contact 14 is urged by the spring 13 to press an inner surface of the lid 2 at all times, and slides together with the movable board 1 when the movable board 1 is rotated.

As shown in FIGS. 1 and 2, the lid 2 has a bearing hole 2a and a ring-shaped projection 2b. The bearing hole 2a receives the upper end portion 1c fitted thereinto. The ring-shaped projection 2b is formed on a lower surface of the lid 2 near the periphery and fits into a groove 3b formed in the base board 3. The lid 2 and base board 3 are formed of a resin material that is heat resistant, oil resistant, and suitable for ultrasonic welding. Such a resin material includes nylon resin, polypropylene, and the like. The lid 2 is mated with the base board 3 with the movable board 1 and circuit board 6 sandwiched between the lid 2 and the base board 3. The fitting areas of the ring-shaped projection 2b and the groove 3b that fittingly receive the ring-shaped projection 2b are bonded together by the ultrasonic welding or the vibration welding.

Figure 6:
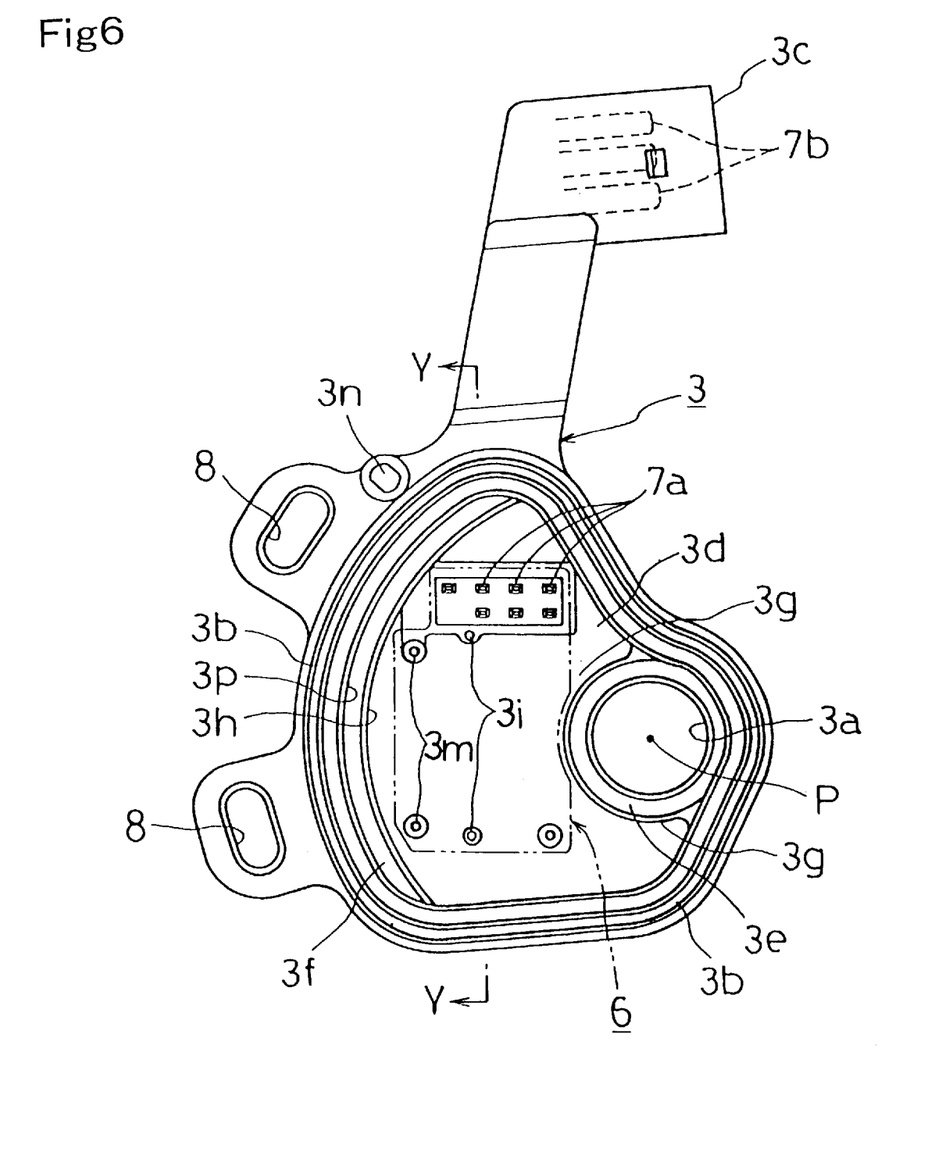
FIG. 6 is a top view of a base board, showing the first embodiment of the invention.

The base board 3 is insert-molded with conductors 7 and a metal ring 8 and is secured to the outer side of a body of the automatic transmission by means of a screw inserted through the metal ring 8. As shown in FIG. 6, the conductors 7 insert-molded with the base board 3 have first ends 7a projecting outwardly from the bottom surface 3d and second ends 7b projecting into a connector 3c. The base board 3 has the slide surface 3e formed around the periphery of the bearing hole 3a on which the projection 1f on the lower surface of the movable board 1 slides. The base board 3 further has a slide surface 3f on the periphery of the bottom surface 3d on which the projection 1g on the lower surface of the movable board 1 slides.

As shown in FIGS. 1, 2, and 6, the slide surfaces 3e and 3f are smoothly finished to improve sliding ability of the projections 1f and 1g of the movable board 1. The base board 3 has an inner peripheral projection 3h and an inner wall 3p adjacent to each other, which guide the projection 1g to slide on the slide surface 3f between the projection 3h and the inner wall 3p. The inner peripheral projection 3h is on the inner periphery of the slide surface 3f facing the bearing hole 3a, and the inner wall 3p is on the outer periphery of the slide surface 3f. The base board 3 has the bearing hole 3a on the inner periphery of the slide surface 3e and an outer projection 3g on the outer periphery of the slide surface 3e. The outer projection 3g guides the projection 1f to slide on the slide surface 3e.

The outer projection 3g and the inner projection 3h have round tips and serve to guide the movable board 1. The base board 3 is formed with a groove 3k in a surface that contacts the lid 2, the surface surrounding the bottom surface 3d in which the movable board 1 is accommodated. The groove 3k receives a packing 12. Reference numeral 3n in FIG. 6 denotes a positioning hole that serves to position the shaft of the transmission lever of the automatic transmission relative to the movable board 1.

The yoke 5 is a molding frame used for molding the permanent magnet 4 into a desired shape by injecting a magnetic material. The yoke 5 has the bottom 5b that serves as the bottom of the recess into which the material of the permanent magnet 4 is injected. The yoke 5 has bent end portions 5c whose tips are exposed on the surface of the movable board 1, a plurality of bottoms 5b on which the permanent magnet 4 is formed, gate holes 5a, and connecting portions 5d that connect the adjacent bottoms 5b to each other.

As shown in FIGS. 3 and 5, the plurality of bottoms 5b and the bent end portions 5c are connected via the connecting portions 5d into a single continuous piece, so that the bottoms 5b and the bent end portions 5c define the recess when the movable board 1 is molded into a primary article. As shown in FIG. 3, the bottoms 5b are in the form of an arc concentric to the axis P of the hollow shaft 1a of the movable board 1.

Figure 7:
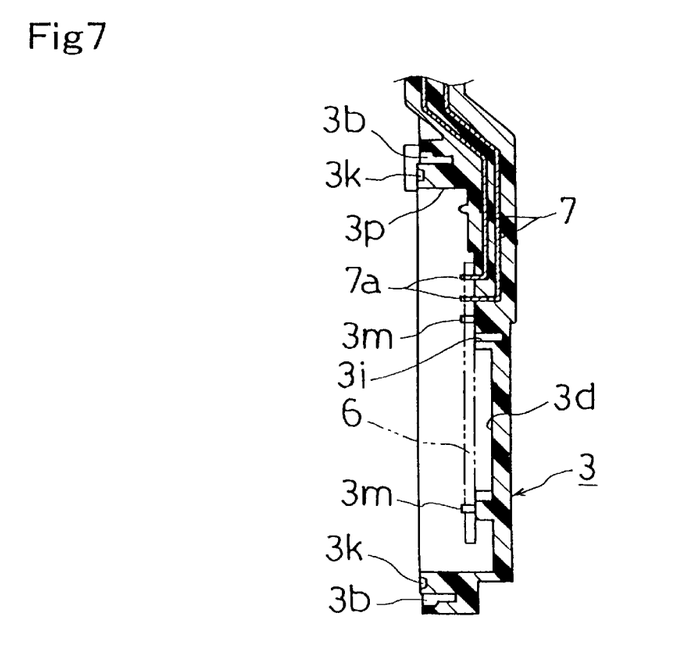
FIG. 7 is an enlarged longitudinal cross-sectional view taken along lines 7—7 of FIG. 6.
Figure 8:
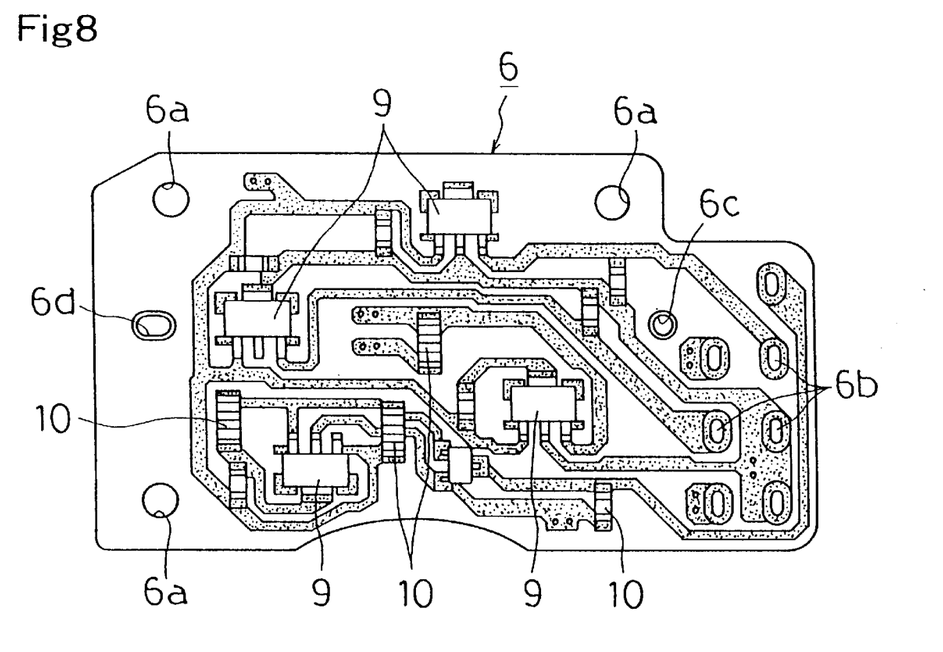
FIG. 8 is an enlarged top view of a circuit board, illustrating the first embodiment of the invention.

As shown in FIGS. 6 and 7, the first ends 7a of the conductors 7 rise from the bottom surface 3d of the base board 3 and extend through the through-holes 6b formed in the circuit board 6. The conductors 7 are soldered at the through-holes 6b. Two projections 3m and 3m rise from the bottom surface 3d of the base board 3. As shown in FIGS. 6 and 8, the circuit board 6 has a positioning hole 6c and position adjusting hole 6d into which the two projections 3m and 3m extend to position the circuit board relative to the base board 3. The circuit board 6 is then secured to the base board 3 by means of screws threaded into the blind holes 3i through the through-holes 6a. The circuit board 6 and the base board 3 may be formed in one-piece construction.

The positioning hole 6c is a perfect circle formed at a reference location on the circuit board 6 as shown in FIG. 8. The position adjusting hole 6d is an elongated hole that allows fine adjustment of the position of the circuit board 6. The circuit board 6 has a plurality of magnetic sensors 9 and electronic parts 10 mounted thereon, the magnetic sensors detecting the magnetic force of the permanent magnets 4 disposed at locations that oppose the magnetic sensors 9.

The magnetic sensors 9 may take the form of a Hall effect element, a Hall 1C, an MR element or the like. As shown in FIG. 2, the magnetic sensors 9 are disposed such that the magnetic sensors 9 are not in contact with the movable board 1 and there is a distance of H1 between the magnetic sensors 9 and the permanent magnet 4. The distance H1 ranges from 0.1 mm to 0.6 mm.

The operation of the first embodiment of the aforementioned construction will now be described in detail.

When the driver operates the shift lever, the lever position of the automatic transmission for the automobile is changed. The movable board 1 of the inhibitor switch rotates about the hollow shaft 1a in accordance with the pivotal movement of the shift lever, so that the permanent magnet 4 and pressure piece 14 move correspondingly. The pressure piece 14 urged by the spring 13 slides on an inner surface 2c of the lid 2, ensuring stable rotation of the movable arm 1b of the movable board 1 without rattling.

This ensures that the distance H1 between the magnetic sensor 9 and the permanent magnet 4 is accurately maintained, and therefore, the positioning accuracy is improved. When the movable board 1 rotates, the magnetic sensor 9 on the circuit board 6 near the movable board 1 responds to a change in magnetic field resulting from the movement of the permanent magnet 4, thereby detecting the selected position of the transmission lever.

A second embodiment will now be described with reference to FIGS. 9 to 11 of the drawings. Elements that are the same as those in the first embodiment have been given the same reference numerals and the further description thereof is omitted.

Reference numeral 15 denotes the movable board. The movable board 15 includes a hollow shaft 15a and a movable arm 15b. The hollow shaft 15a receives the transmission lever (not shown) of an automatic transmission which is fitted thereinto. The movable arm 15b has a recess 15n formed therein into which a movable piece 16 is inserted with a spring 17 abutting thereto. The movable board 15 has an upper end portion 15c that fits into a bearing hole 2a formed in the lid 2, and a lower end portion 15d that fits into a bearing hole 3a formed in the base board 3. Thus, the movable board 15 is rotatably sandwiched between the lid 2 and the base board 3.

Figure 9:
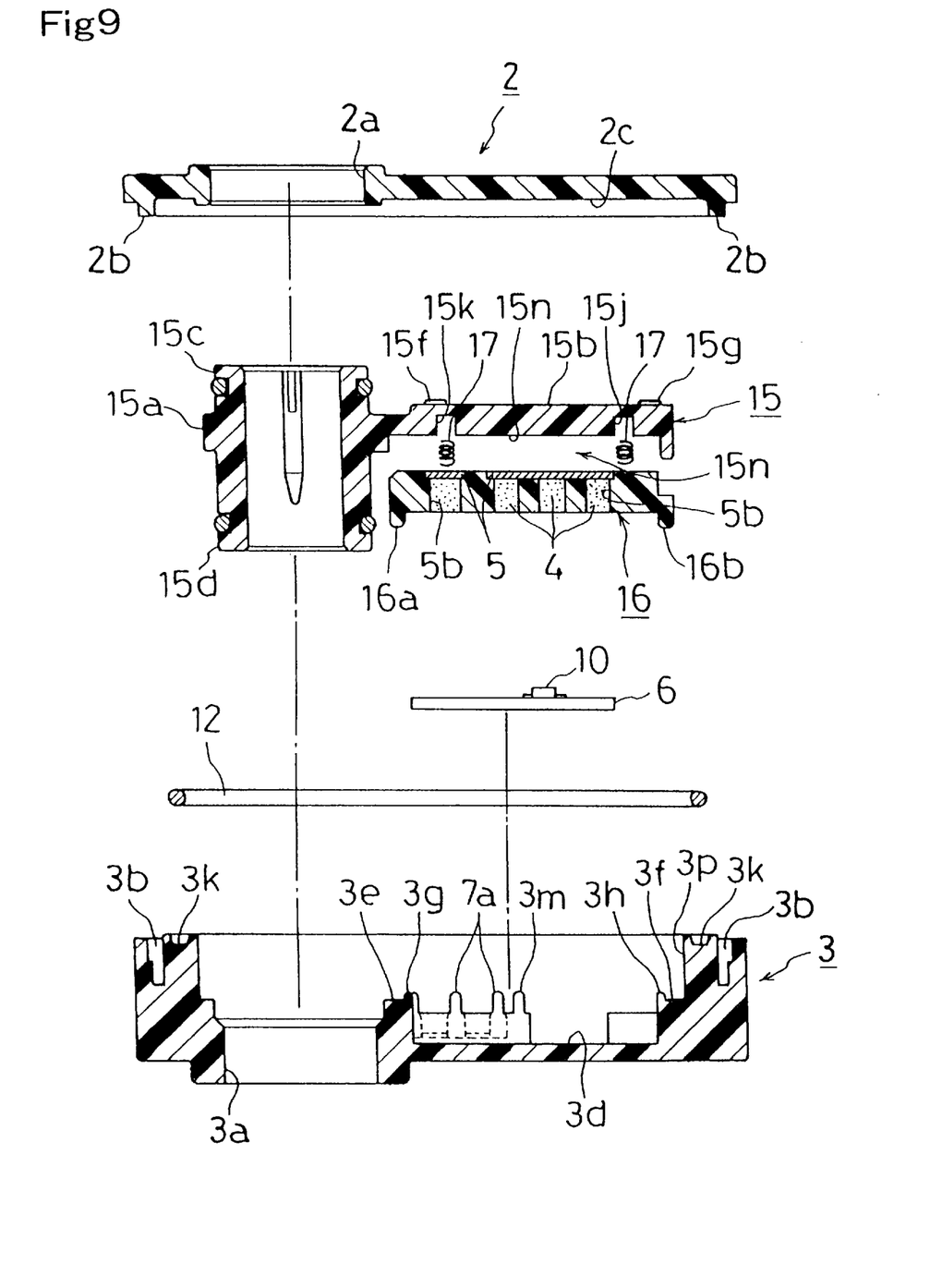
FIG. 9 is an exploded cross-sectional view of a second embodiment of the invention.
Figure 10:
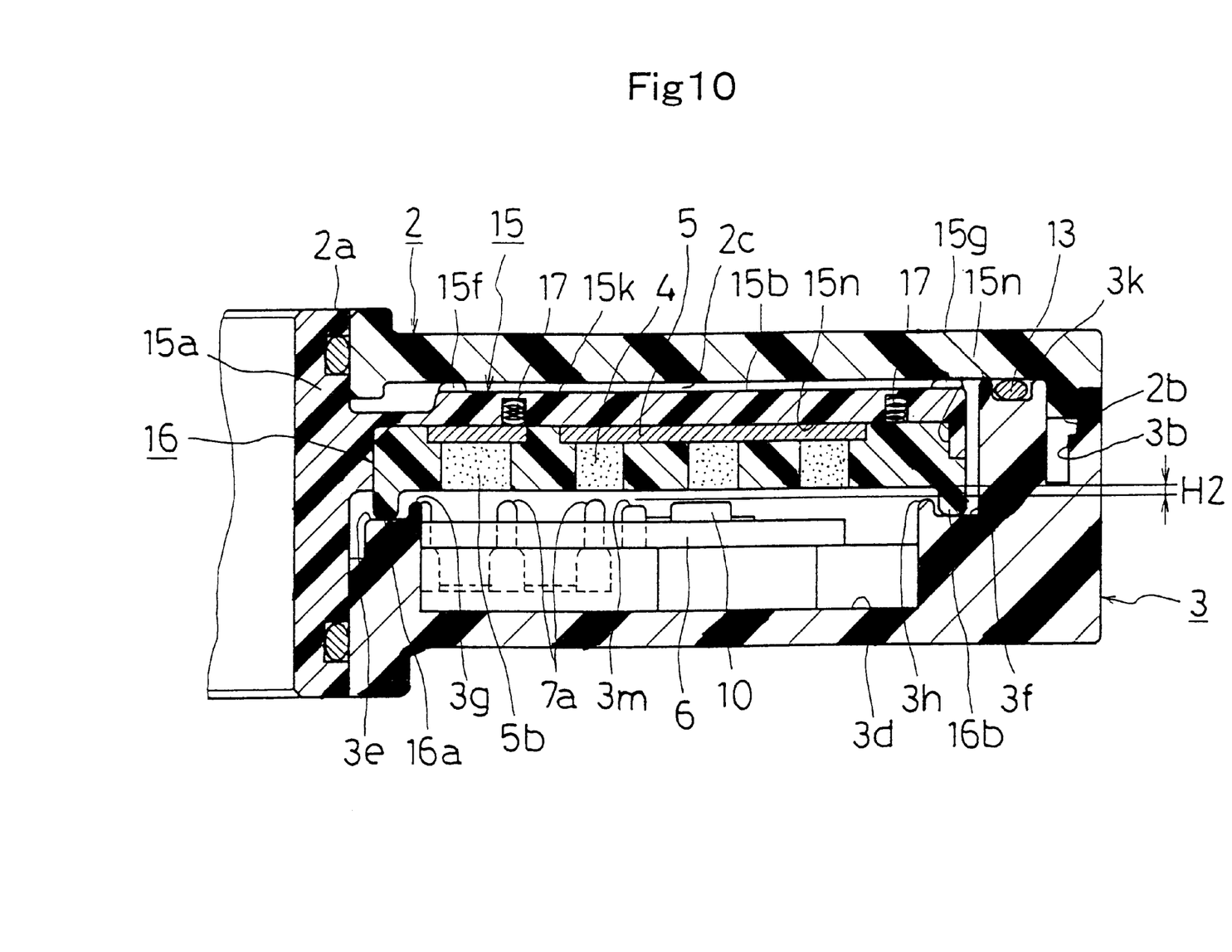
FIG. 10 is an enlarged central longitudinal cross sectional view, showing the second embodiment of the invention.

As shown in FIG. 9, the projections 15f and 15g project from the upper surface of the movable arm 15b, the projection 15f surrounding the inner periphery of the movable arm 15b near the upper end portion 15c while the projection 15g extending near the outer periphery of the movable arm 15b. The movable arm 15b has the recess 15n formed in its lower surface, and a plurality of blind holes 15j, 15k, and 15m formed in the recess 15n.

The recess 15n receives the movable piece 16 such that the movable piece 16 is movable vertically. Thus, the recess 15n is in the shape of a hole configured to the movable piece 16. As shown in FIG. 11, there are provided the blind holes 15j, 15k, and 15m near the peripheral wall.

A total of three blind holes 15j, 15k, and 15m are used, but the number of the blind holes may be more than three. The blind holes 15j, 15k, and 15m may be formed in either of the movable board 15 or the movable piece 16.

The movable piece 16 is made by insert-molding the permanent magnet 4 and the yoke 5 of the aforementioned first embodiment from a resin material. The movable piece 16 is fitted into the recess 15n with the spring 17 abutting thereto such that the movable piece 16 can be extended from and retracted into the recess 15n. The plurality of springs 17 are located on the movable piece 16 and urge the movable piece 16 against the base board 3.

Figure 11:
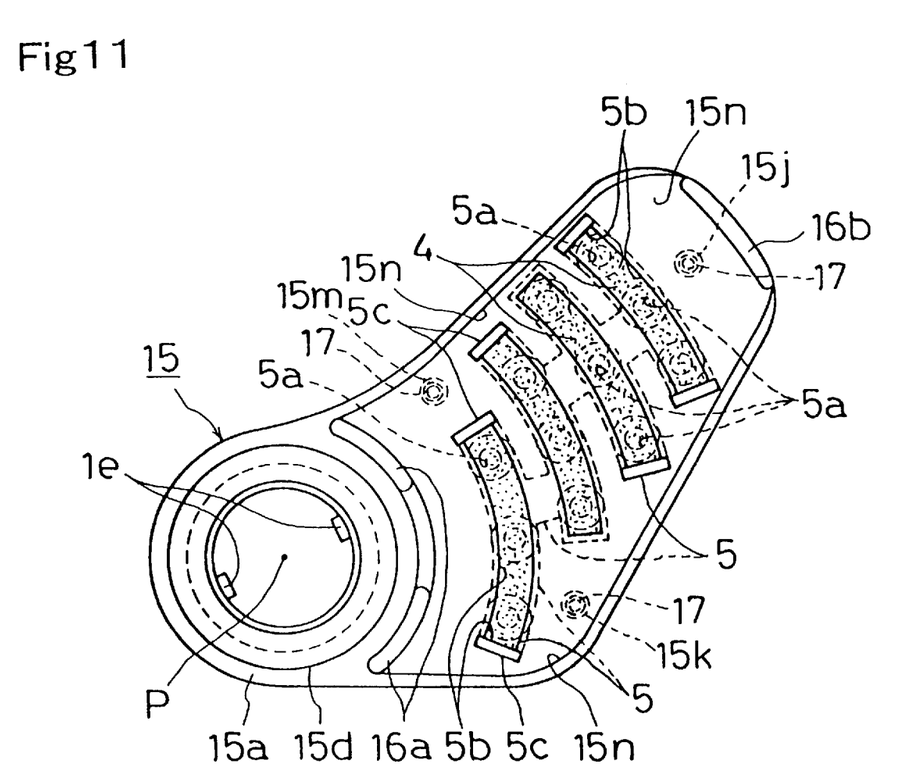
FIG. 11 is an enlarged bottom view of a movable board of the second embodiment of the invention.

As shown in FIG. 11, the movable piece 16 has projections 16a and 16b projecting therefrom, the projections 16a and 16b being of the same design as the projections 1f and 1g formed on the lower surface of the movable board 1 of the first embodiment. The projections 16a and 16b have end portions having a semicircular cross section so that they slide around the bearing hole 3a of the base board 3 and on the slide surfaces 3e and 3f surrounding the bottom surface 3d.

The movable piece 16 has the projection 16a on its one end and the projection 16b on the other end. The movable piece 16 has four arcuate permanent magnets 4 in the middle, and the bent portions 5c of the yoke 5 are exposed such that the permanent magnets 4 and the bent portions 5c are flush with the surface of the movable piece 16. As shown in FIG. 11, the projections 16a and 16b and permanent magnets 4 are arranged to be concentric to the axis P of the hollow shaft 15a of the movable board 15.

The yoke 5 and the permanent magnets 4 are of the same shapes as the yoke and the permanent magnets of the first embodiment, and are insert-molded in the movable piece 16. The plurality of springs 17 are located on the movable piece 16 in pressure contact with the movable piece 16 and urge the movable piece 16 against the base board 3. The movable piece 16 and the spring 17 are received in the recess 15n formed in the movable board 15 such that the spring 17 urges the movable piece 16 outwardly of the recess 15n, and the movable piece 16 is movable upward and downward in the recess 15n.

As shown in FIG. 9, the yoke 5 and permanent magnets 4 are exposed in a flush manner to the surface of the movable board 15. The springs 17 are, for example, coil springs.

The operation of the second embodiment of the present invention of the aforementioned construction will now be described in detail.

When the driver operates the shift lever, the selected position of the automatic transmission of the automobile is changed. The movable board 15 of the inhibitor switch rotates about the hollow shaft 15a in accordance with the pivotal motion of the shift lever, so that the permanent magnets 4 and the movable piece 16 move correspondingly. The movable projection 16a of the movable piece 16 urged by the springs 17 slides on the slide surfaces 3e, and the projection 16b slides on the slide surfaces 3f.

The springs 17 are located between the movable arm 15b and the movable piece 16, so that the projections 15f and 15g of the movable arm 15b are pressed against the inner surface 2c of the lid 2. The springs 17 urge the movable pieces 16 so that the projections 16a are pressed against the slide surface 3e of the base board 3, and the projection 16b is pressed against the slide surface 3e of the base board 3. Therefore, the distance H2 between the permanent magnets 4 and the magnetic sensors 9 is set to a predetermined value by the projections 16a and 16b, and the movable arm 1b of the movable board 1 rotates without rattling.

The aforementioned construction maintains the constant distance H2 between the magnetic sensors 9 and the permanent magnets 4, thereby improving detection accuracy in detecting the selected position of the transmission. When the movable board 1 rotates, the magnetic sensor 9 on the circuit board 6 located near the movable board 1 detects the change in magnetic field resulting from the movement of the permanent magnets 4, thereby detecting a selected position of the transmission.

The present invention configured as described above provides the following features and advantages.

The inhibitor switch according to the invention comprises a movable board having a permanent magnet. The movable board is rotatable in accordance with a selected position of an automatic transmission. A magnetic sensor detects magnetic lines of force of the permanent magnet and is mounted on a base board. The movable board is rotatably supported on the base board and on a lid. The inhibitor switch is characterized by the movable board having a movable arm urged by a spring. With this construction, a constant distance is maintained between the magnetic sensor and the permanent magnet, thereby improving the reliability of the inhibitor switch.

According to the first embodiment, the movable board includes a hollow shaft and the movable arm formed in one-piece construction with the hollow shaft, the movable arm having the permanent magnet mounted thereon. The movable arm has the permanent magnet and a projection which are provided on one surface of the movable arm facing the base board, the projection being in pressure contact with the base board. The movable arm has a blind hole formed in the other surface of the movable arm facing the lid, the blind hole receiving a pressure-contact inserted together with the spring therein. This construction allows the movable board to experience less friction, thereby improving the sliding performance of the movable board. The construction maintains a constant distance between the magnetic sensor and the permanent magnet, thereby improving the reliability of the inhibitor switch.

The projection and the permanent magnet of the movable board are arranged on the movable arm and are concentric to an axis of the hollow shaft on the movable board. Therefore, the friction between the movable board and the board can be reduced.

According to the second embodiment, the movable board includes a hollow shaft and a movable arm which are formed in one piece construction. The permanent magnet is provided in a movable piece received in a recess formed in the movable board. The movable piece can be extended from the recess and retracted into the recess. This construction provides a constant distance between the magnetic sensor and the movable board on which the permanent magnet is carried on, thereby improving the reliability of the inhibitor switch.

In the second embodiment, the movable arm of the movable board has projections formed on a surface thereof facing the lid, the projections being in pressure contact with an inner surface of the lid. The movable arm has a recess formed in a surface thereof facing the base board, the recess receiving the movable piece therein. The movable piece has the permanent magnet on the surface thereof facing the base board, and has projections in pressure contact with the base board. This construction eliminates the rattling of the movable board, thereby improving the sliding motion of the movable board.

The spring is one of a plurality of springs which are received in blind holes formed either in the movable arm or in the movable piece. Therefore, the movable piece can be positioned accurately so that the reliability of the inhibitor switch is improved.

The movable piece has the projections and the permanent magnet arranged on the movable piece such that the projections and the permanent magnet are concentric to an axis of the hollow shaft. Therefore, the friction between the movable piece and the base board can be reduced.

The base board has slide surfaces on which the projections slide, the slide surfaces being formed around the hollow shaft and around an outer periphery of a bottom surface of the base board. Therefore, the smoothness of the sliding movement of the movable board is improved.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An inhibitor switch comprising:
   a movable board having a movable arm portion carrying a permanent magnet and being rotatable in accordance with a selected position of an automatic transmission;
   a magnetic sensor detecting magnetic lines of force of the permanent magnet;
   a base board having the magnetic sensor mounted thereon and having the movable board rotatably supported thereon; and
   a lid having the movable board rotatably supported thereon;
   wherein said permanent magnet is urged by a spring toward said magnetic sensor and maintained at an accurate distance from said magnetic senor by projections disposed between said movable board and said base board.

2. The inhibitor switch according to claim 1, wherein the movable board includes a hollow shaft, the movable arm portion being formed in one-piece construction with the hollow shaft, the movable arm portion having the permanent magnet mounted thereon;
   the movable arm portion has the permanent magnet and a projection which are provided on one surface of the movable arm portion facing the base board, the projection being in pressure contact with the base board, and the movable arm portion has a blind hole formed in an other surface of the movable arm portion facing the lid, the blind hole receiving a pressure-contact member inserted together with the spring therein.

3. The inhibitor switch according to claim 2, wherein the projection and the permanent magnet on the movable board are arranged on the movable arm portion, and are concentric to an axis of rotation of the hollow shaft of the movable board.

4. The inhibitor switch according to claim 1, wherein the movable board includes a hollow shaft formed in one-piece construction with said movable arm portion; and
   the permanent magnet is provided in a movable piece received together with the spring in a recess formed in the movable board on a surface thereof facing the base board, the movable piece being received such that the movable piece is extendible from the recess and retractable into the recess.

5. The inhibitor switch according to claim 4, wherein the movable arm portion of the movable board has projections formed on a surface thereof facing the lid, the projections being in pressure contact with an inner surface of the lid; and
   the movable piece has the permanent magnet on a surface thereof facing the base board, and has projections in pressure contact with the base board.

6. The inhibitor switch according to claim 5, wherein said spring comprises a plurality of springs received in blind holes formed either in the movable arm portion or in the movable piece.

7. The inhibitor switch according to claim 6, wherein the movable piece has the projections and the permanent magnet arranged on the movable piece such that the projections and the permanent magnet are concentric to an axis of rotation of the hollow shaft.

8. The inhibitor switch according to claim 7, wherein the base board has slide surfaces on which the projections slide, the slide surfaces being formed around the hollow shaft and around an outer periphery of a bottom surface of the base board.

9. The inhibitor switch according to claim 5, wherein the movable piece has the projections and the permanent magnet arranged on the movable piece such that the projections and the permanent magnet are concentric to an axis of rotation of the hollow shaft.

10. The inhibitor switch according to claim 4, wherein said spring comprises a plurality of springs received in blind holes formed either in the movable arm portion or in the movable piece.

11. The inhibitor switch according to claim 3, wherein the base board has slide surfaces on which the projections slide, the slide surfaces being formed around the hollow shaft and around an outer periphery of a bottom surface of the base board.

12. An inhibitor switch comprising:
    a base board having a magnetic sensor mounted thereon;
    a lid that fits over the base board;
    a movable board supported between said base board and said lid;
    a permanent magnet carried by a movable structure associated with said movable board, said movable structure having a first plurality of projections urged by a spring into pressure contact with said base board to maintain an accurate distance between said permanent magnet and said magnetic sensor and prevent undesirable movement of the permanent magnet relative to the magnetic sensor.

13. The inhibitor switch according to claim 12, wherein said movable structure comprises a movable arm portion integral with said movable board, said movable arm portion has the permanent magnet and the projection provided on one surface of the movable arm portion facing the base board, and the movable arm portion has a blind hole formed in the other surface of the movable arm portion facing the lid, a pressure-contact member and the spring being disposed within said blind hole, said movable arm portion being rotatably supported by said base board and said lid.

14. The inhibitor switch according to claim 12, wherein said movable board comprises a movable arm portion integral with said movable board, and said movable structure comprises a movable piece received together with the spring into a recess formed in said movable arm portion on a surface thereof facing said base board, said movable piece being received such that the movable piece can be extended from the recess and retracted into the recess.

15. The inhibitor switch according to claim 14, wherein said movable arm portion has a second plurality of projections formed on a surface thereof facing the lid, said second plurality of projections being in pressure contact with an inner surface of the lid; and
    said movable piece has the permanent magnet on a surface thereof facing the base board and said first plurality of projections in pressure contact with the base board.

16. The inhibitor switch according to claim 15, wherein said spring comprises a plurality of springs received in blind holes formed either in the movable arm portion or in the movable piece.

17. The inhibitor, switch according to claim 15, wherein the base board has a plurality of slide surfaces on which said first plurality of projections slide, the slide surfaces being concentric with an axis about which said movable board rotates.

* * * * *